US010795645B2

(12) United States Patent
Mohamed et al.

(10) Patent No.: US 10,795,645 B2
(45) Date of Patent: Oct. 6, 2020

(54) NEURAL NETWORK FOR PROGRAM SYNTHESIS

(71) Applicant: Microsoft Technology Licensing, LLC, Redmond, WA (US)

(72) Inventors: Abdelrahman S. A. Mohamed, Redmond, WA (US); Rishabh Singh, Kirkland, WA (US); Lihong Li, Redmond, WA (US); Dengyong Zhou, Redmond, WA (US); Pushmeet Kohli, Bellevue, WA (US); Emilio Parisotto, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 111 days.

(21) Appl. No.: 15/470,784

(22) Filed: Mar. 27, 2017

(65) Prior Publication Data

US 2018/0275967 A1 Sep. 27, 2018

(51) Int. Cl.
*G06F 8/30* (2018.01)
*G06N 3/04* (2006.01)
*G06N 3/10* (2006.01)
*G06N 3/08* (2006.01)

(52) U.S. Cl.
CPC ............ *G06F 8/30* (2013.01); *G06N 3/0445* (2013.01); *G06N 3/0454* (2013.01); *G06N 3/08* (2013.01); *G06N 3/105* (2013.01)

(58) Field of Classification Search
CPC ....................................................... G06F 8/30
USPC ....................................................... 717/106
See application file for complete search history.

(56) References Cited

U.S. PATENT DOCUMENTS

| | | | |
|---|---|---|---|
| 6,654,950 B1 * | 11/2003 | Barnishan | G06F 8/20 |
| | | | 717/136 |
| 7,861,221 B2 | 12/2010 | Fleischmann et al. | |
| 8,510,246 B2 | 8/2013 | Cox | |
| 9,182,980 B2 | 11/2015 | Campbell et al. | |
| 2007/0169036 A1 | 7/2007 | Garner et al. | |
| 2007/0208492 A1 * | 9/2007 | Downs | G08G 1/0104 |
| | | | 701/117 |
| 2011/0302553 A1 | 12/2011 | Gulwani | |
| 2013/0346982 A1 | 12/2013 | Kalai et al. | |

(Continued)

FOREIGN PATENT DOCUMENTS

| | | |
|---|---|---|
| EP | 0401975 A2 | 12/1990 |
| EP | 0688448 B1 | 10/1997 |
| JP | H07319681 A | 12/1995 |

OTHER PUBLICATIONS

Devlin et al. "RobustFill: Neural Program Learning under Noisy I/O" Mar. 21, 2017 (Year: 2017).*

(Continued)

*Primary Examiner* — Chat C Do
*Assistant Examiner* — Bradford F Wheaton
(74) *Attorney, Agent, or Firm* — Schwegman Lundberg & Woessner, P.A.

(57) ABSTRACT

Described are systems, methods, and computer-readable media for program generation in a domain-specific language based on input-output examples. In accordance with various embodiments, a neural-network-based program generation model conditioned on an encoded set of input-output examples is used to generate a program tree by iteratively expanding a partial program tree, beginning with a root node and ending when all leaf nodes are terminal.

16 Claims, 10 Drawing Sheets

(56) References Cited

U.S. PATENT DOCUMENTS

| | | | |
|---|---|---|---|
| 2015/0356401 A1 | 12/2015 | Vinyals et al. | |
| 2016/0019587 A1* | 1/2016 | Hueter | G06Q 30/0282 |
| | | | 705/14.53 |
| 2016/0099010 A1 | 4/2016 | Sainath et al. | |
| 2017/0192956 A1* | 7/2017 | Kaiser | G06F 17/271 |
| 2018/0197089 A1* | 7/2018 | Krasser | G06N 5/04 |
| 2018/0276535 A1 | 9/2018 | Mohamed et al. | |

OTHER PUBLICATIONS

Mou, et al., "On End-to-End Program Generation from User Intention by Deep Neural Networks", In Journal of Computing Research Repository, Oct. 2015, 4 pages.

Balog, et al, "Deepcoder: Learning to Write Programs", In Journal of Computing Research Repository, Nov. 2016, pp. 1-19.

Mou, et al., "Building Program Vector Representations for Deep Learning", In Proceedings of 8th International Conference on Knowledge Science, Engineering and Management, Oct. 28, 2015, 11 pages.

Gaunt, et al., "TERPRET: A Probabilistic Programming Language for Program Induction", In Journal of Computing Research Repository, Aug. 2016, pp. 1-7.

Richards, et al., "Auto-coding implementation of Model Predictive Control with application to flight control", In Proceedings of European Control Conference, Aug. 23, 2009, pp. 150-155.

Costa, et al., "Learning Incremental Syntactic Structures with Recursive Neural Networks", In Proceedings of Fourth International Conference on Knowledge-Based Intelligent Engineering Systems and Allied Technologies, vol. 2, Sep. 30, 2000, 4 pages.

Alur, et al., "Syntax-Guided Synthesis", In Proceedings of Dependable Software Systems Engineering, May 2015, 8 pages.

Bielik, et al., "PHOG: Probabilistic Model for Code", In Proceedings of the 33rd International Conference on Machine, Jun. 19, 2016, 10 pages.

Biermann, Alan W., "The Inference of Regular LISP Programs from Examples", In Journal of IEEE Transactions on Systems, Man, and Cybernetics, vol. 8, Issue 8, Aug. 1978, pp. 585-600.

Bunel, et al., "Adaptive Neural Compilation", In Journal of Computing Research Repository, May 2016, pp. 1-25.

Gaunt, et al., "TerpreT: A Probabilistic Programming Language for Program Induction", In Journal of Computing Research Repository, Aug. 2016, pp. 1-50.

Graves, et al., "Neural Turing Machines", In Journal of Computing Research Repository, Oct. 2014, pp. 1-26.

Gulwani, Sumit, "Automating String Processing in Spreadsheets Using Input-Output Examples", In Proceedings of 38th Annual ACM SIGPLAN-SIGACT Symposium on Principles of Programming Languages, Jan. 26, 2011, pp. 317-329.

Gulwani, et al., "Synthesis of Loop-free Programs", In Proceedings of 32nd ACM SIGPLAN Conference on Programming Language Design and Implementation, Jun. 4, 2011, pp. 62-73.

Gulwani, et al., "Spreadsheet Data Manipulation using Examples", In Journal of Communications of the ACM, vol. 55, No. 8, Aug. 2012, pp. 97-105.

Hindle, et al., "On the Naturalness of Software", In Journal of Communications of the ACM, vol. 59, No. 5, May 2016, pp. 122-131.

Irsoy, et al., "Bidirectional Recursive Neural Networks for Token-Level Labeling with Structure", In Proceedings of Neural Information Processing Systems Deep Learning Workshop, Dec. 9, 2013, pp. 1-9.

Joulin, et al., "Inferring Algorithmic Patterns with Stack-Augmented Recurrent Nets", In Proceedings of Annual Conference on Neural Information Processing Systems, Dec. 7, 2015, pp. 1-9.

Kurach, et al., "Neural Random-Access Machines", In Journal of Computing Research Repository, Nov. 2015, pp. 1-17.

Le, et al., "The Inside-Outside Recursive Neural Network Model for Dependency Parsing", In Proceedings of Conference on Empirical Methods on Natural Language Processing, Oct. 25, 2014, pp. 729-739.

Liang, et al, "Learning Programs: A Hierarchical Bayesian Approach", In Proceedings of the 27th International Conference on Machine Learning, Jun. 21, 2010, 8 pages.

Menon, et al., "A Machine Learning Framework for Programming by Example", In Proceedings of the 30th International Conference on Machine Learning, Jun. 1, 2013, 9 pages.

Neelakantan, et al., "Neural Programmer: Inducing Latent Programs with Gradient Descent", In Journal of Computing Research Repository, Nov. 2015, pp. 1-18.

Paulus, et al., "Global Belief Recursive Neural Networks", In Journal of Advances in Neural Information Processing Systems, Dec. 8, 2014, pp. 1-9.

Raychev, et al., "Predicting Program Properties from Big Code", In Proceedings of the 42nd Annual ACM SIGPLAN-SIGACT Symposium on Principles of Programming Languages, Jan. 15, 2015, pp. 111-124.

Reed, et al., "Neural programmer-interpreters", In Journal of Computing Research Repository, Nov. 2015, pp. 1-13.

Riedel, et al., "Programming with a differentiable forth interpreter", In Journal of Computing Research Repository, May 2016, pp. 1-14.

Schkufza, et al., "Stochastic superoptimization", In Proceedings of the eighteenth international conference on Architectural support for programming languages and operating systems, Mar. 16, 2013, pp. 305-315.

Singh, et al., "Synthesizing data structure manipulations from storyboards", In Proceedings of the 19th ACM SIGSOFT symposium and the 13th European conference on Foundations of software engineering, Sep. 5, 2011, 11 pages.

Singh, et al., "Automated feedback generation for introductory programming assignments", In Proceedings of the 34th ACM SIGPLAN Conference on Programming Language Design and Implementation, Jun. 16, 2013, pp. 15-26.

Solar-Lezama, Armando, "Program Synthesis by Sketching", In Thesis of University of California, Dec. 21, 2016, 214 pages.

Solar-Lezama, et al., "Programming by sketching for bit-streaming programs", In Proceedings of the ACM SIGPLAN conference on Programming language design and implementation, Jun. 12, 2005, pp. 281-294.

Summers, Phillip D, "A methodology for lisp program construction from examples", In Journal of the ACM, vol. 24, Issue 1, Jan. 1977, pp. 161-175.

Maddison, et al, "Structured generative models of natural source code", In Proceedings of the 31st International Conference on Machine, Jun. 26, 2014, 9 pages.

Esmaeilzadeh, Hadi, et al., "Neural Acceleration for General-Purpose Approximate Programs", In Proceedings of the 45th Annual IEEE/ACM International Symposium on Microarchitecture, Dec. 1, 2012, pp. 449-460.

Faunes, et al., "Generating model transformation rules from examples using an evolutionary algorithm", In Proceedings of the 27th IEEE/ACM International Conference on Automated Software Engineering, Sep. 3, 2012, pp. 250-253.

Gulwani, Sumit, "Programming by Examples", In Dependable Software Systems Engineering, Apr. 19, 2016, 22 pages.

Jeon, et al., "JSketch: sketching for Java", In Proceedings of the 2015 10th Joint Meeting on Foundations of Software Engineering, Aug. 30, 2015, pp. 934-937.

Lee, et al., "Synthesizing regular expressions from examples for introductory automata assignments", In Proceedings of the ACM SIGPLAN International Conference on Generative Programming: Concepts and Experiences, Oct. 31, 2016, pp. 70-80.

Manshadi, et al., "Integrating Programming by Example and Natural Language Programming", In Proceedings of the twenty-seventh AAAI Conference on Artificial Intelligence, Jun. 30, 2013, 7 pages.

Singh, et al., "Predicting a Correct Program in Programming by Example", In Proceedings of 27th International Conference on Computer Aided Verification, Jul. 18, 2015, pp. 1-17.

(56) References Cited

OTHER PUBLICATIONS

Udupa, et al., "Transit: Specifying Protocols with Concolic Snippets", In Proceedings of 34th ACM SIGPLAN Conference on Programming Language Design and Implementation, Jun. 16, 2013, pp. 1-10.
"Non Final Office Action Issued in U.S. Appl. No. 15/470,751", dated Feb. 7, 2020, 18 pages.
Parisotto, et al., "Neuro-Symbolic Program Synthesis", In Journal of Computing Research Repository, Nov. 6, 2016, pp. 1-14.

* cited by examiner

| INPUT | OUTPUT |
|---|---|
| William Henry Charles | Charles, W. |
| Michael Johnson | Johnson, M. |
| Barack Rogers | Rogers, B. |
| Martha D. Saunders | Saunders, M. |
| Peter T Gates | Gates, P. |

*FIG. 1A*

String $e := \text{Concat}(f1,...,fn)$

Substring $f := \text{ConstrStr}(s) \mid \text{SubStr}(v, pl, pr)$

Position $p := (r, k, Dir) \mid \text{ConstPos}(k)$

Direction $Dir := \text{Start} \mid \text{End}$

Regex $r := s \mid t1...\mid tN$

*FIG. 1B*

NEURAL NETWORK FOR PROGRAM SYNTHESIS

BACKGROUND

A number of neural network architectures have been proposed for program induction. Given a set of input-output examples, these architectures can learn mappings between inputs and outputs that generalize to new test inputs, i.e., allow outputs to be predicted based on the new test input(s). However, the neural networks are often computationally expensive and hard to train; they generally need to be trained for each task separately; and to the extent they capture only program behavior, the learned mappings can be difficult to interpret and verify.

The desire for better interpretability and scalability of neural network models has motivated research into program synthesis, that is, the automatic construction of interpretable programs in a given domain-specific language (DSL) that are consistent with a given specification (taking the form of, e.g., partial programs, input-output examples, or natural language). Various approaches have been developed to search over the space of possible programs in the DSL; these approaches include, for example, stochastic, constraint-based, and version-space-algebra-based algorithms. Many of these techniques not only take significant engineering and research efforts to develop carefully-designed heuristics for efficient search, but are limited in their range of applicability and the sizes and types of programs they can synthesize.

SUMMARY

This summary section is provided to introduce aspects of embodiments in a simplified form, with further explanation of the embodiments following in the detailed description. This summary section is not intended to identify essential or required features of the claimed subject matter, and the particular combination and order of elements listed this summary section is not intended to provide limitation to the elements of the claimed subject matter.

Described herein are machine-learning approaches for program synthesis, and associated neural-network architectures that facilitate generating programs incrementally without the need for an explicit search. In various embodiments, a neural-network architecture including a program-generation model and an input-output encoder is trained end-to-end on a plurality of programs in a given DSL and respective associated sets of input-output examples. Once trained, the program-generation model can automatically construct a program in the DSL consistent with a set of input-output examples provided at test time, based on a distributed representation of the input-output examples generated by the input-output encoder. (The program to be created for a particular set of input-output examples is herein also referred to as the "target program.") Program construction may involve iteratively expanding a partial program tree, using expansion probabilities computed with the program-generation model to select, in each iteration, an expansion among a set of valid expansions.

One aspect relates to a method for program synthesis. The method involves providing a test set of input-output examples for a target program as well as an input-output encoder and a program-generation model (including a neural network) for a given DSL, the input-output encoder and neural network of the program-generation model having been trained on a plurality of programs within the DSL and a plurality of respective training sets of input-output examples associated with the programs. The method further involves, using one or more hardware processors, performing operations comprising: encoding the set of input-output examples using the input-output encoder; conditioning the program-generation model on the encoded set of input-output examples; and generating a program tree representing the target program by iteratively expanding a partial program tree, beginning with a root node and ending when all leaf nodes are terminal, using the neural network of the program-generation model.

In various embodiments, the program-generation model includes a recursive, reverse-recursive neural network (R3NN). For a DSL defining a plurality of symbols and a plurality of production rules, the R3NN may specify distributed representations of the plurality of symbols and the plurality of production rules as well as, for each of the plurality of production rules, first and second deep neural networks. Iteratively expanding the partial program tree may include, in each iteration, computing global leaf representations for at least non-terminal ones of the leaf nodes of the partial program tree, computing a probability distribution for a set of valid expansions from the global leaf representations and the distributed representations of the production rules (e.g., a normalized exponential distribution over products of the global leaf representations and the distributed representations of the production rules), selecting a non-terminal leaf node and a production rule based on the computed probability distribution, and expanding the partial program tree by applying the selected production rule to the selected non-terminal leaf node. The global leaf representations may be computed by retrieving the distributed representations of symbols associated with the leaf nodes, performing a recursive bottom-to-top pass through the partial program tree from the leaf nodes to the root node using the first deep neural networks, and thereafter performing a reverse-recursive top-to-bottom pass through the partial program tree from the root node to the leaf nodes using the second deep neural networks. Optionally, the global leaf representations may be processes with a bidirectional long short term memory (LSTM) neural network prior to computing the probability distribution.

The program-generation model may be conditioned prior to performing the recursive bottom-to-top pass, after performing the recursive bottom-to-top pass and prior to performing the reverse-recursive top-to-bottom pass, or after performing the reverse-recursive top-to-bottom pass. If done prior to performing the recursive bottom-to-top pass, conditioning may involve appending the encoded set of input-output examples to the distributed representations of the symbols associated with the leaf nodes to obtain updated distributed representations of the leaf nodes, and passing the updated distributed representations to a conditioning network. If done after performing the recursive bottom-to-top pass and prior to performing the reverse-recursive top-to-bottom pass, conditioning may involve appending the encoded set of input-output examples to a distributed representation of the root node resulting from the bottom-to-top pass to thereby obtain an updated distributed representation of the root node, and passing the updated distributed representation of the root node to a conditioning network. If done after performing the reverse-recursive top-to-bottom pass, conditioning may involve appending the encoded set of input-output examples to the global leaf representations to obtain updated global leaf representations, and passing the updated global leaf representations to a conditioning network prior to computing the probability distribution. Encoding the set of input-output examples may include processing input and output of each input-output example separately using two respective deep bidirectional LSTM neural networks to obtain respective input and output representations, and computing a cross correlation between each input example representation and its respective output example representation.

Another aspect relates to a system for program synthesis, including one or more hardware processors and one or more machine-readable media storing instructions that, when executed by the hardware processor(s), cause the hardware processor(s) to perform the operations of the above-described method for program synthesis.

Yet another aspect relates to a machine-readable medium storing (or multiple machine-readable media collectively storing) instructions for execution by one or more hardware processors to perform the operations of the above-described method for program synthesis.

A further aspect relates to a method for training neural networks for program synthesis. For a given DSL, the method involves providing a plurality of programs in the DSL (e.g., by uniformly sampling the DSL) and a plurality of respective sets of input-output examples associated with the programs (each input-output example within each set comprising a well-formed input and an output produced by the respective associated program from the input), and creating a program-generation model and an input-output encoder for the domain-specific language by training respective neural networks of the program-generation model and the input-output encoder on the plurality of programs and the associated input-output examples. The program-generation model, following conditioning on a test set of input-output examples encoded by the trained input-output encoder, is to generate a program tree representing a target program consistent with the test set of input-output examples by iteratively expanding a partial program tree, beginning with a root node and ending when all leaf nodes are terminal symbols in the DSL, using the neural network of the program-generation model. The neural network of the program-generation model may be an R3NN. The R3NN may specify distributed representations of a plurality of symbols and a plurality of production rules defined by the DSL as well as first and second deep neural networks for each of the plurality of production rules, and may iteratively expand the partial program tree by computing global leaf representations for at least non-terminal ones of the leaf nodes, computing a probability distribution for a set of valid expansions from the global leaf representations and the distributed representations of the production rules, selecting a non-terminal leaf node and a production rule based on the computed probability distribution, and expanding the partial program tree by applying the selected production rule to the selected non-terminal leaf node.

Further aspects relate to a system including one or more hardware processors and one or more machine-readable media storing instructions that, when executed by the hardware processor(s), cause the hardware processor(s) to perform the operations of the above-described training method, and a machine-readable medium storing (or multiple machine-readable media collectively storing) instructions for execution by one or more hardware processors to perform the operations of the above-described training method.

BRIEF DESCRIPTION OF THE DRAWINGS

The foregoing will be more readily understood from the following detail description of various embodiments, in particular, when taken in conjunction with the accompanying drawings.

FIG. 1A is a table of input-output examples of an example string-manipulation program, illustrating a specific program synthesis task in accordance with one embodiment.

FIG. 1B is a list of operations available in the DSL of regular-expression-based string manipulations, in accordance with one embodiment.

DETAILED DESCRIPTION

Figure 2A:
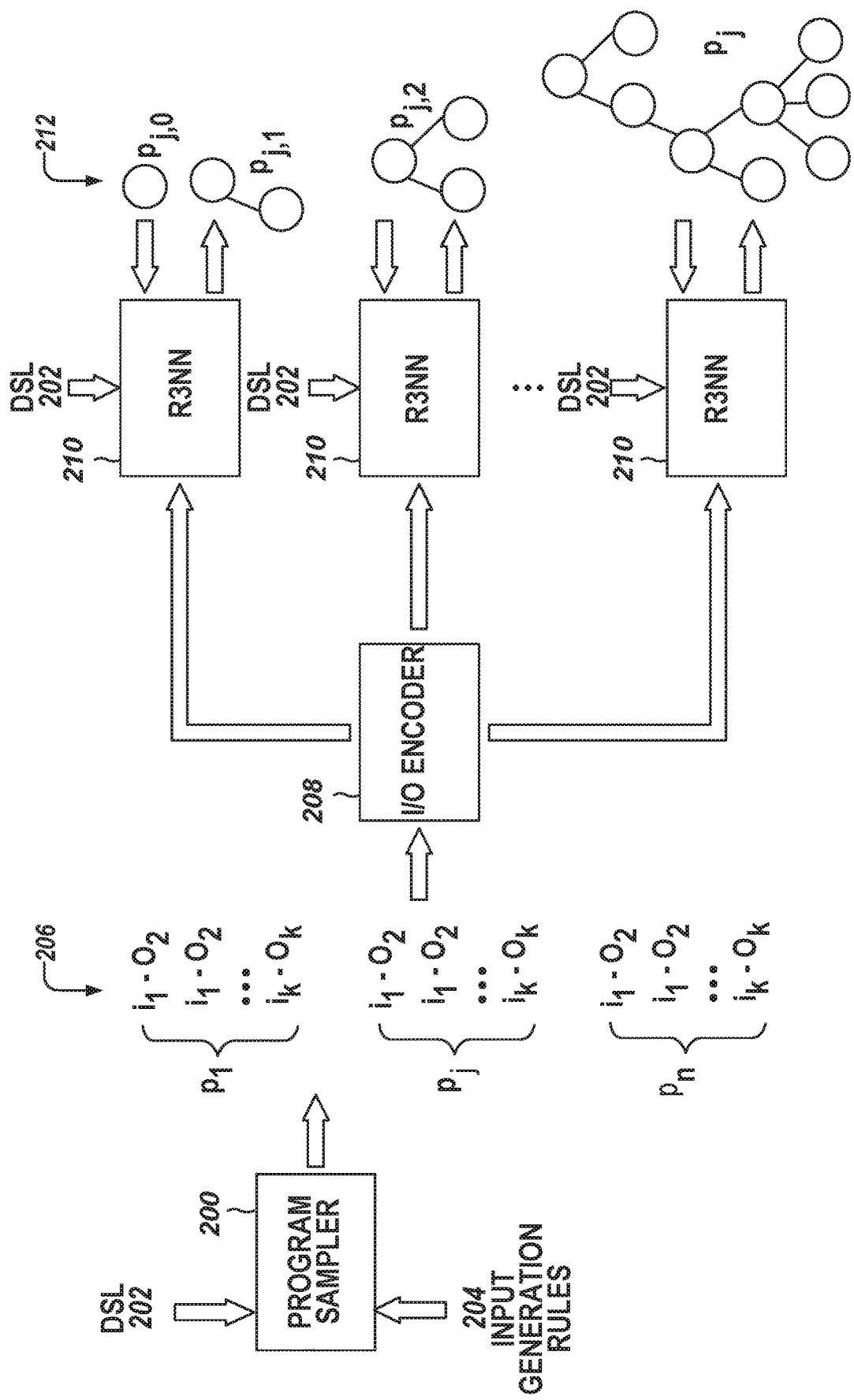
FIG. 2A is a diagram schematically illustrating a workflow for training neural networks for program synthesis in accordance with various embodiments.

Described herein, in various embodiments, are approaches to automatically (e.g., by a computer executing suitable software) synthesizing interpretable programs in a given DSL that are consistent with a program specification provided in terms of pairs of input-output examples. More formally, the problem of program synthesis in accordance herewith can be defined as follows: Given a DSL L, the goal is to automatically construct a synthesis algorithm A such that, given a set of input-output examples, $\{(i_1, o_1), \ldots, (i_n, o_n)\}$, A returns a program P∈L that conforms to the input-output examples, i.e.:

$$\forall j, 1 \le j \le n : P(i_j) = o_j.$$

The synthesis algorithm A may include an input-output encoder that generates distributed representations (e.g., vector representations) of the input-output examples, and a program generation model that, upon conditioning with the distributed representations of the input-output examples, creates a program in L consistent therewith.

Various aspects of program synthesis as described herein are generally applicable to any DSL, including, for example, string transformations based on regular expressions, low-level bit manipulations, and data structure manipulations. FIGS. 1A and 1B illustrate a concrete example of a program-synthesis task in the DSL of regular-expression-based string transformations. As shown by the input-output examples in FIG. 1A, the task is to convert names in the format "First Name (Middle Name or Initial) Last Name" into the format "Last Name, First Initial." For instance, the input "William Henry Charles" is to be converted to the output "Charles, W." FIG. 1B shows the set of string-manipulation operations available in the DSL to accomplish the task. The top-level string expression e is a concatenation of a finite list of substring expressions $f_1, \ldots, f_n$. A substring expression f can either be a constant string s or a substring expression, which is defined using two position logics $p_l$ (left) and $p_r$ (right). A position logic corresponds to a symbolic expression that evaluates to an index in the string, and may be either be a constant position k or a token-match expression (r, k, Dir), which denotes the start or end (depending on direction Dir) of the kth match of token r in input string v. A regular-expression ("Regex") token can either be a constant string s or one of eight regular expression tokens: p (ProperCase), C (CAPS), l (lowercase), d (Digits), α (Alphabets), αn (Alphanumeric), (StartOfString), and $ (EndOfString). Using these operations, a program consistent with the examples shown in FIG. 1A may take the form: Concat($f_1$, ConstStr(","), $f_2$, ConstStr("."))$, where $f_1 \equiv$ SubStr(v, (" ",−1, End), ConstPos (−1)) and $f_2 \equiv$ SubStr(v, ConstPos(0), ConstPos(1)). The program concatenates the following four strings: i) the substring between the end of the last whitespace and the end of the input string, ii) the constant string ",", iii) the first character of the input string, and iv) the constant string "."

Figure 3A:
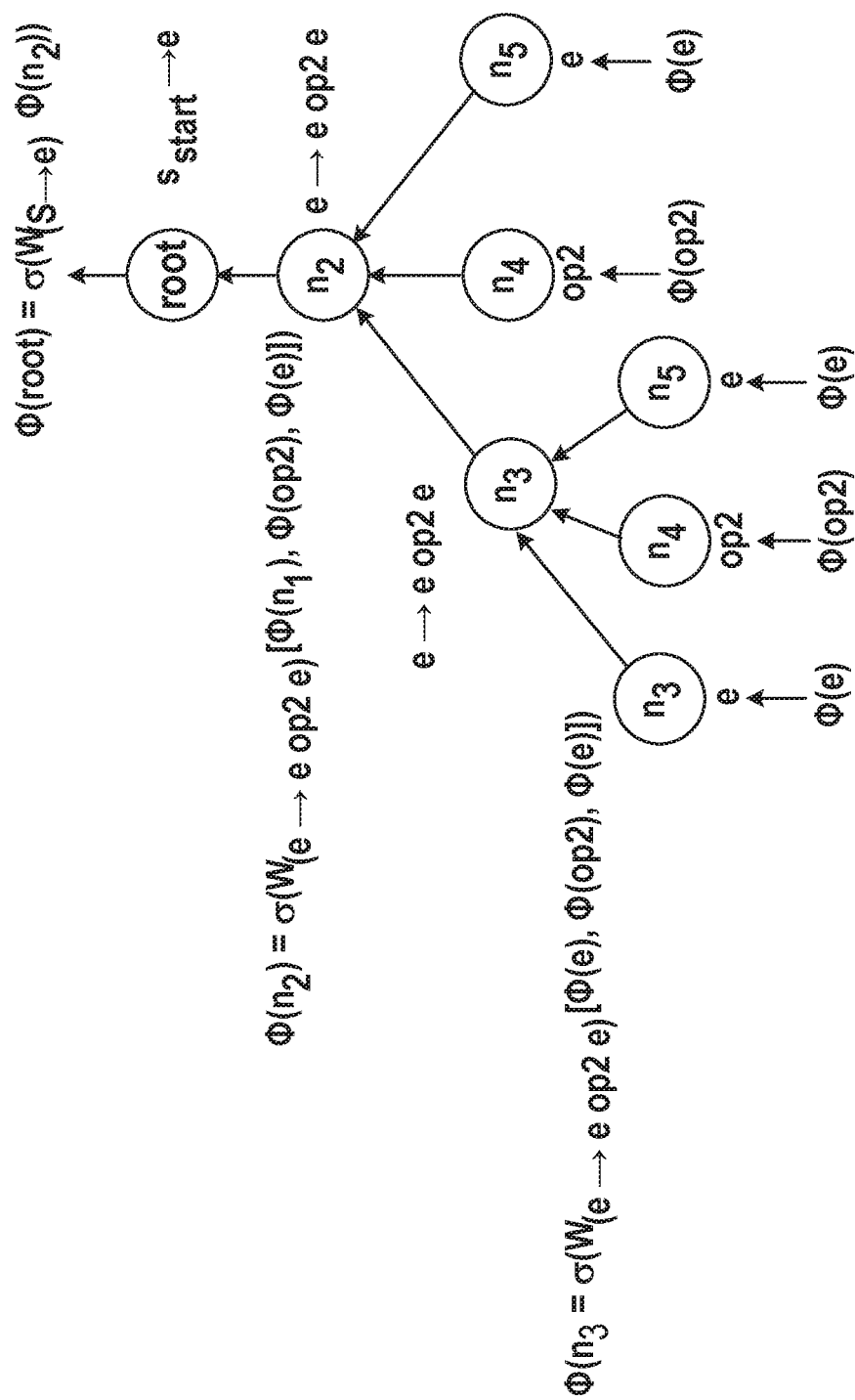
FIG. 3A is diagram schematically illustrating a recursive pass through an example partial program tree, as is used in the computation of expansion probabilities in accordance with various embodiments.
Figure 3B:
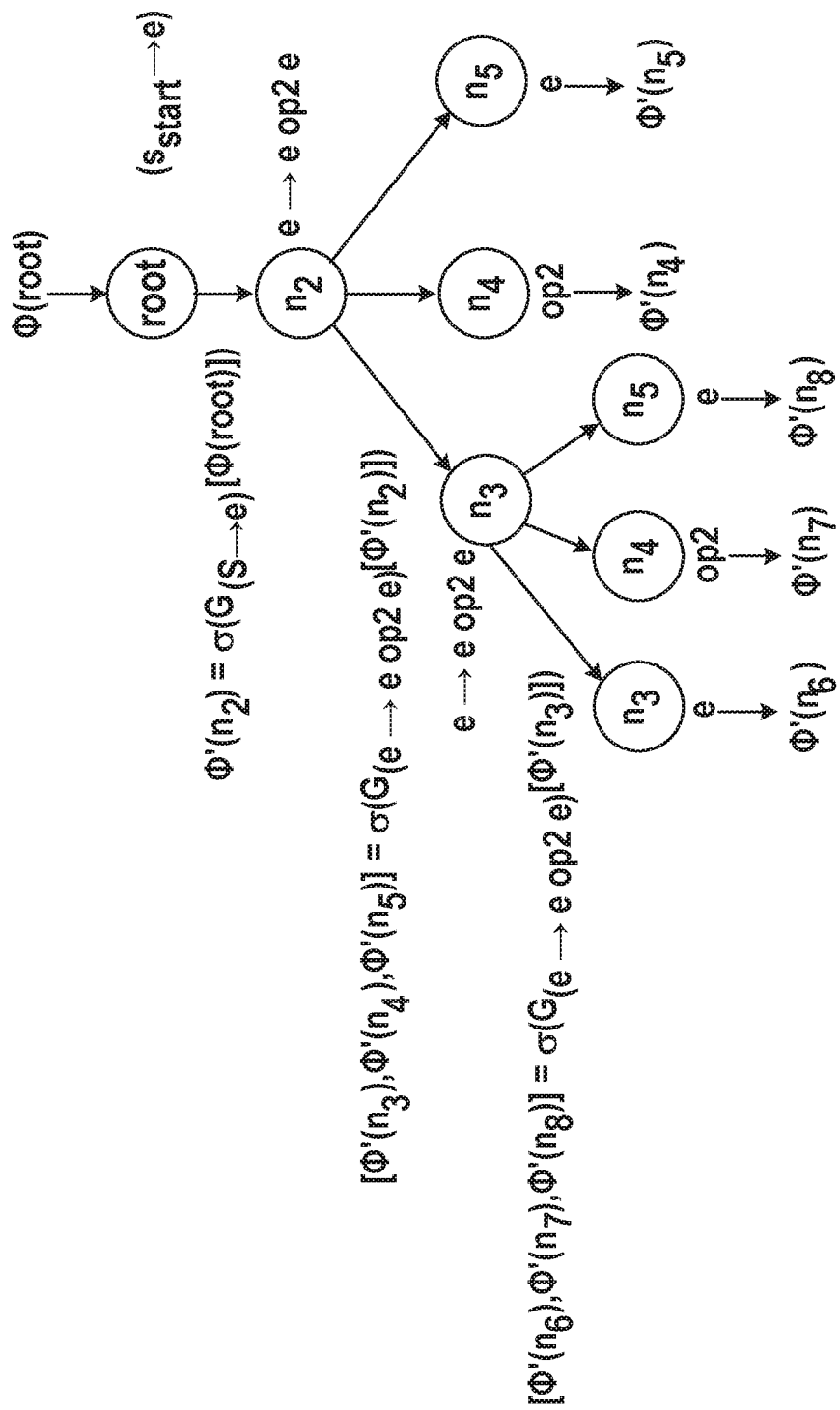
FIG. 3B is diagram schematically illustrating a reverse-recursive pass through the example partial program tree of FIG. 3A, as is used in the computation of expansion probabilities in accordance with various embodiments.

A DSL can be considered a context-free grammar with terminal and non-terminal symbols S and production rules R that allow representing programs and partial programs as tree structures (see, e.g., FIGS. 3A and 3B for example partial program trees). A partial program tree has two types of nodes (apart from the root node): leaf nodes and inner non-leaf nodes. A leaf node represents a symbol in the DSL, whether non-terminal or terminal. An inner non-leaf node represents a particular production rule of the DSL, and the number of children of the non-leaf node is equivalent to the arity of the right hand side of the rule it represents. A partial program tree can be iteratively expanded by applying production rules (e→e op2 e) to the non-terminal leaf nodes. Accordingly, a partial program tree represents a program obtained after a number of steps into construction. Program construction is complete once all leaves of the tree represent terminal symbols (such that the tree cannot be further expanded with production rules); such a complete tree is herein referred to simply as the "program tree," and represents a completed program under the DSL that is ready for execution.

A naive way to perform a search over the programs in a given DSL is to begin with the start symbol of the DSL as root node, and then iteratively expand the partial tree by randomly choosing non-terminal leaf nodes (also simply "non-terminals") to expand with randomly chosen production rules until a derivation with only terminal leaf nodes (also simply "terminals"), corresponding to a complete program tree, is reached. In accordance with various embodiments, by contrast, the program space is searched more efficiently with a generative model (herein also "program-generation model") that assigns probabilities to different non-terminals in a partial derivation and corresponding expansions to guide the search for complete derivations. The generative model is implemented with a neural network, and is conditioned on input-output examples encoded themselves by a neural network. The generative model and the input-output encoder, which collectively constitute the synthesis algorithm A, may be trained end-to-end on a training set of programs in the DSL together with their corresponding input-output examples.

FIG. 2A schematically illustrates a workflow for training neural networks for program synthesis in accordance with various embodiments. To generate a large training set (e.g., including millions of programs with 10-20 input-output examples each), a program sampler 200 may uniformly sample programs from the DSL 202 and generate well-formed inputs (e.g., input strings) that satisfy the preconditions of the programs based on suitable input generation rules 204. The corresponding outputs (e.g., output strings) are obtained by running the programs on the inputs. The resulting input-output examples 206 are passed through the input-output encoder 208, which generates distributed representations therefrom. These distributed representations of the input-output examples, along with the symbols and production rules of the DSL 202, are passed to the program-generation model 210 (e.g., in accordance with various embodiments, an R3NN model as described in detail below), which encodes and iteratively expands partial program trees 212 to incrementally build complete program trees. A measure of the difference between a program generated by the program-generation model 210 based on the input-output examples and the corresponding program sampled by the program sampler 200 is used as feedback to adjust parameters of the neural networks used in the input-output encoder 208 and the program-generation model 210. Suitable difference measures and techniques for training neural networks are well-known to those of ordinary skill in the art. Network weights for the program-generation model 210 and the input-output encoder 208 may be trained, for example, using the Adaptive Moment Estimation (Adam) variant of the stochastic gradient descent algorithm.

Figure 2B:
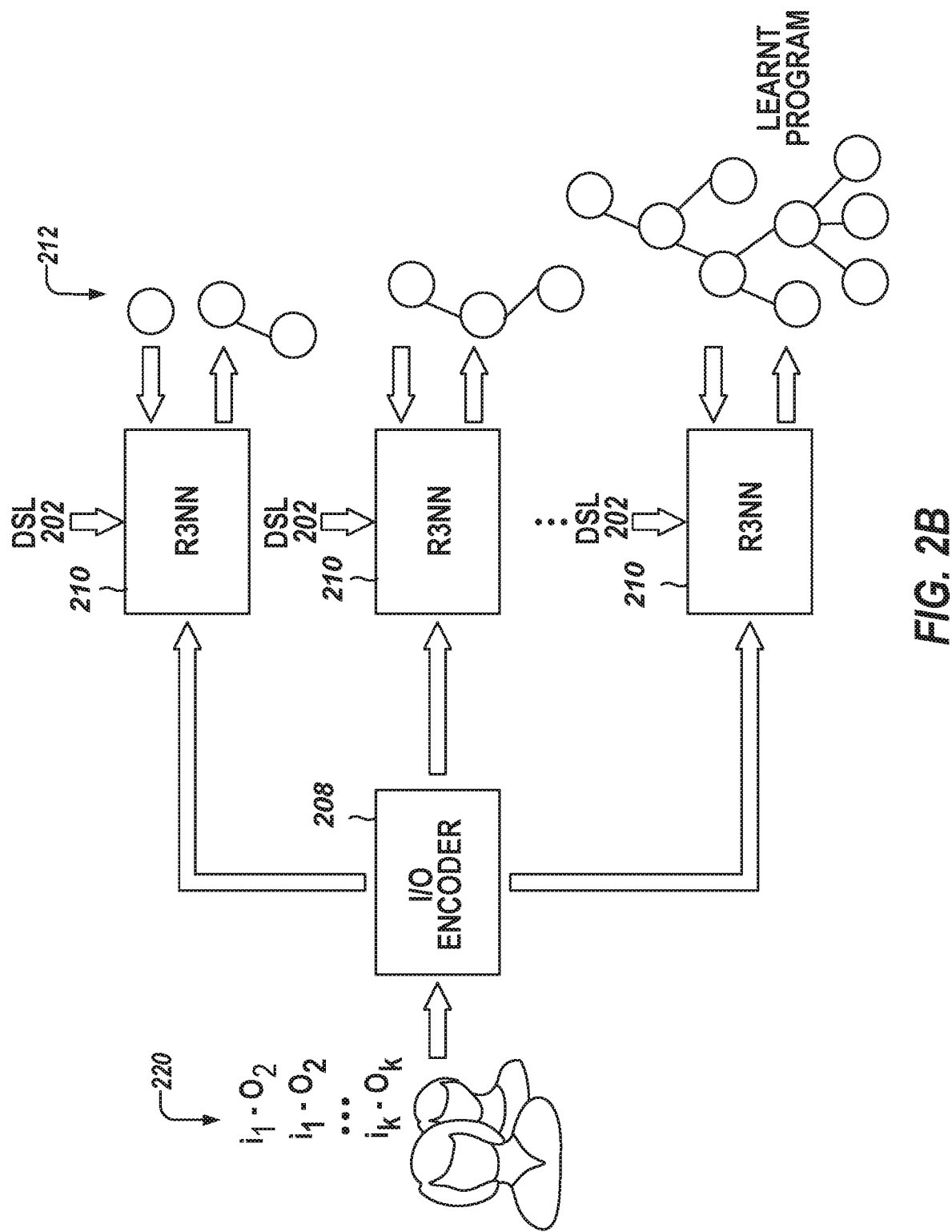
FIG. 2B is a diagram schematically illustrating a workflow for using trained neural networks to synthesize a program in a given DSL based on input-output examples in accordance with various embodiments.

FIG. 2B schematically illustrates a workflow for using the input-output encoder 208 and program-generation model 210, once trained for a particular DSL 202, to synthesize programs in that DSL based on input-output examples in accordance with various embodiments. A set of input-output examples 220 specifying the task to be performed by the program is fed into the input-output encoder 208 to create a distributed representation therefrom. The encoded input-output examples are provided as input to the program-generation model 210, which, in the same manner as in the training phase described with reference to FIG. 2A, but now with fixed values of the neural-network parameters, iteratively expands a partial program tree 212, beginning with the root node, until all leaf nodes of the tree are terminals.

Recursive-Reverse-Recursive Neural Network (R3NN)

In various embodiments, the program-generation model 210 uses an R3NN to provide an efficient way of assigning probabilities to every valid expansion in the current partial program. Herein, a valid expansion is specified by two components: the production rule used, and the position of the non-terminal leaf node to which the production rule is applied relative to every other node in the tree. To account for the first component, a separate distributed representation for each production rule is maintained. The second component is handled using an architecture in which each node of the partial tree encodes global information about every other node in the tree. In brief, the R3NN assigns an initial distributed representation to each leaf node, and then performs a recursive pass through the tree from the leaves to the root node, followed by a reverse-recursive pass from the root back to the leaf nodes, resulting in a "global leaf representation" for each leaf node. The probability of a given expansion is calculated from the global leaf representation of the respective non-terminal leaf node and the distributed representation of the respective production rule, e.g., as a quantity proportional to the inner product between the production rule representation and the global leaf representation of the non-terminal node.

In more detail, the R3NN includes the following parameters for the grammar described by a DSL (which can be any functional DSL, i.e., any DSL without control flow (via loops and conditionals, etc.) and without stateful variables):

1. For every symbol s∈S, an M-dimensional representation $\theta(s) \in \mathbb{R}^M$.

2. For every production rule r∈R, an M-dimensional representation $\omega(r) \in \mathbb{R}^M$.

3. For every production rule r∈R, a deep neural network $f_r$ which takes as input a vector $x \in \mathbb{R}^{Q \cdot M}$, with Q being the number of symbols on the right hand side of the production rule r, and outputs a vector $y \in \mathbb{R}^M$. The input to the production-rule network $f_r$ is a concatenation of the distributed representations of each of its right-hand-side (RHS) symbols, and the output is a distributed representation for the left-hand-side (LHS) symbol.

4. For every production rule r∈R, an additional deep neural network $g_r$, which takes as input a vector $x \in \mathbb{R}^M$ and outputs a vector $y \in \mathbb{R}^{Q \cdot M}$. The deep neural network $g_r$ can be thought of as a reverse production-rule network that takes as input a distributed representation of the LHS symbols and produces a concatenation of the distributed representations of RHS symbols of the production rule.

FIGS. 3A and 3B illustrate recursive and reverse-recursive passes through an example partial program tree during the computation of expansion probabilities using an R3NN in accordance with various embodiments. Let E be the set of all valid expansions in a partial program tree T; let L be the current leaf nodes of T and N the current non-leaf (i.e., rule) nodes of T; and let s(l) be the symbol of leaf l∈L and r(n) represent the production rule of non-leaf node n EN. To compute the probability distribution over the set E, the R3NN first computes a distributed global leaf representation for each leaf node (that is, a representation for each leaf node that contains global tree information).

With reference to FIG. 3A, the R3NN initially assigns to each leaf node l∈L in the tree its distributed representation θ(s(l)). A recursive bottom-to-top (RHS-to-LHS) pass through the tree is then performed by going up the tree and applying $f_r(n)$ to every non-leaf node n∈N on its right-hand node representations. At each step, the networks $f_r(n)$ produce a node representation that is input into the parent's rule network. The process is repeated iteratively until the root node is reached. At that point, the root node has an associated fixed-dimensionality global tree representation φ(root). This representation, however, has lost any notion of tree position. To solve this problem, the R3NN now performs what is effectively a reverse-recursive pass that starts at the root node with φ(root) as input and moves towards the leaf nodes.

With reference to FIG. 3B, more concretely, the root node representation φ(root) resulting from the recursive pass is supplied as input into the rule network $g_r$ (root) for the production rule r(root) that is applied to the start symbol in T. This produces a representation φ_(c) for each RHS node c of r(root). If c is a non-leaf node, the procedure is repeated for node c, i.e., φ_(c) is input into $g_r$(c) to get representations φ_(cc) for every RHS node cc of r(c), and so on. If c is a leaf node, the leaf representation φ_(c) now has an information path to φ(root) and thus to every other leaf node in the tree. Accordingly, once the reverse-recursive pass is complete, the resulting distributed representation φ_(l) for every leaf node l contains global tree information (and this therefore a global leaf representation). While the initial leaf representations φ($l_1$) and φ($l_2$) are equal for leaf nodes that have the same symbol type, the global leaf representations φ_($l_1$) and φ_($l_2$) are generally not equal even if they have the same symbol type because the respective leaves are at different positions in the tree.

Once the global leaf representations φ_(l) have been computed, it is straightforward to determine scores for all possible expansions e∈E. For any given expansion e, let e.r be the expansion type (i.e., the production rule r∈R that e applies) and let e.l be the leaf node l that e.r is applied to. The score of an expansion may then be calculated as a function of the global leaf representation φ_(e.l) and the distributed representation ω(e.r). For example, in some embodiments, the score is calculated as the product $Z_e = \varphi\_(e.l) \cdot \omega(e.r)$. The probability distribution over the set of extensions may be a normalized exponential distribution over the scores, that is, the probably of a given expansion e may be the exponentiated score, normalized by the sum of exponentiated scores over all extensions:

$$\pi(e) = \frac{e^{z_e}}{\sum_{e' \in E} e^{z_{e'}}}.$$

In some embodiments, to reduce the minimum length that information has to propagate between nodes in the tree, the global leaf representations are processed with a bidirectional LSTM network (as is known in to those of ordinary skill in the art) right before calculating the scores, and the LSTM hidden states, rather than the leaves themselves, are used in the score calculation. The global leaf representations are ordered sequentially from left-most leaf node to right-mode leaf node, where each leaf node is treated as a time step for a bidirectional-LSTM to process. This processing provides a skip connection between leaf nodes, which potentially reduces the path length that information needs to travel between leaf nodes in the tree.

Input-Output Encoders

To produce a program that is consistent with a given set of input-output examples, the program-generation model is conditioned on the input-output examples. For this purpose, a suitable input-output encoder may generate distributed representations from input-output examples in the DSL, which are thereafter provided as input to the program-generation model. Various embodiments of methods for encoding input-output examples to generate distributed representations are now described with reference to FIGS. 4-6.

Figure 4:
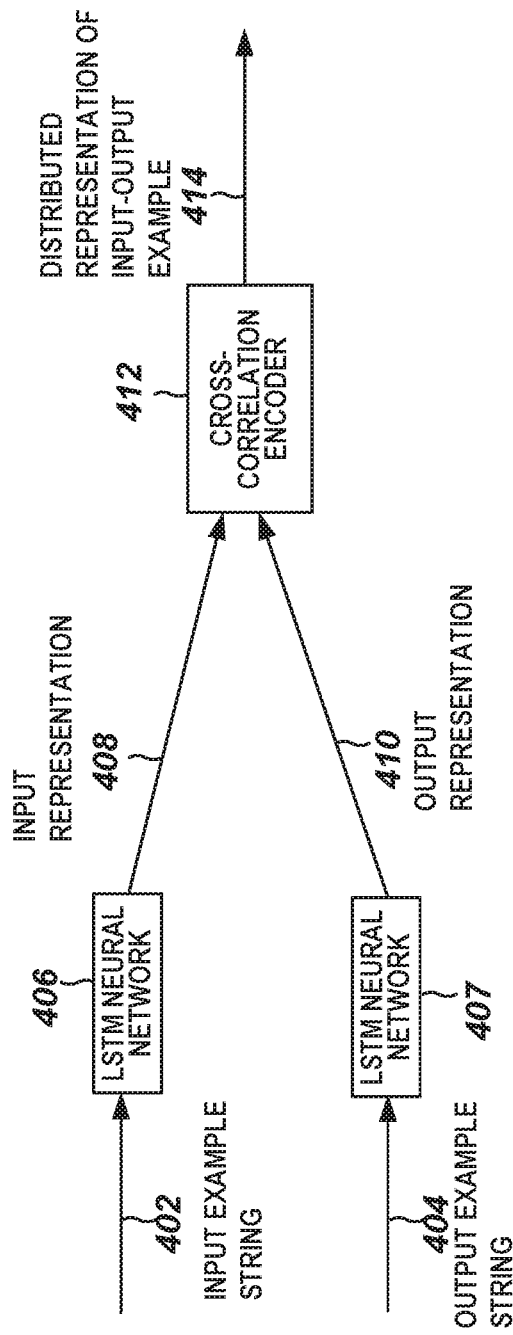
FIG. 4 is a diagram illustrating an example encoding workflow for input-output examples in the DSL of string transformations, in accordance with various embodiments.

FIG. 4 illustrates an example encoding workflow for input-output examples in the DSL of string transformations. Here, an input example string 402 and a corresponding output example string 404 of an input-output example pair are fed into neural networks 406, 407, respectively, of the input-output encoder, and the resulting input representation 408 and output representation 410 are passed on to a cross-correlation encoder 412, which computes a distributed representation 414 of the input-output example.

In various embodiments, as shown, the neural networks 406, 407 are or include LSTM neural networks, as are known to those of ordinary skill in the art. In brief, an LSTM network is a type of neural network that contains LSTM units. An LSTM unit includes no activation function within its recurring units. The LSTM unit generally includes one or more gates that control a flow of data into/out of the unit.

The gates may include an input gate, forget gate, and/or output gate. An input gate controls whether a new value flows into the unit; a forget gate controls whether a value remains in the unit; and an output gate controls whether a value is used to compute an output of the unit. In certain embodiments, the networks 406, 407 are separate deep bidirectional LSTM neural networks.

The neural networks 406, 407 may process the input and output example strings 402, 404 one character at a time in a "forward pass" and/or "backward pass." In a forward pass, the strings are processed, one character at a time, from the first character to the last character. For example, the input string "Barack Rogers," which starts with character "B" and ends with character "s," would be processed in the order "B", "a", "r", "a", "c", "k", "R", "o", "g", "e", "r", and "s" to compute topmost LSTM hidden representations for all characters, where the representations of subsequently processed characters generally depend on the preceding characters. In the backward pass, the strings are processed, one character at a time, from the last character to the first character. Continuing the above example, the input would be processed in the order "s", "r", "e" "g", "o", "R", "k", "c", "a", "r", "a", and "B" to produce hidden representations for all characters, where, again, the representations of subsequently processed characters generally depend on the preceding characters (resulting in different representations than in the forward pass due to the reverse order of processing). Output-string processing in forward and backward paths is analogous. The topmost LSTM hidden representations for the characters may be concatenated to produce input and output string feature vectors. Further, in embodiments implementing bidirectional LSTM networks, where the input-output examples are processed in both a forward pass and a backward pass, the representations for both passes may likewise be concatenated, or otherwise combined (e.g., by averaging, adding, etc.). Concatenation results, for a maximum string length of T (which corresponds to T time steps in the LSTM encoding) and a topmost LSTM hidden dimension H, in a 2HT-dimensional input representation 408 for each input string and a 2HT-dimensional output representation 410 for each output string.

The input and output representations 408, 410 may be concatenated (resulting, e.g., in a 4HT-dimensional representation per input-output example). Further, the (e.g., 4HT-dimensional) representations may be concatenated across input-output examples to obtain a distributed representation of the entire input-output example set. This encoding is conceptually straightforward and has little prior knowledge about the operations being performed over the strings to convert input strings to output strings (e.g., substrings, constant, etc.), which can, however, make it difficult to discover substring indices, especially those which are based on regular expressions. To assist with the discovery of input strings that are copied to the output strings, therefore, various embodiments involve the computation of the cross correlation between the input and output representations 408, 410 (rather than simply concatenating them).

Figure 5:
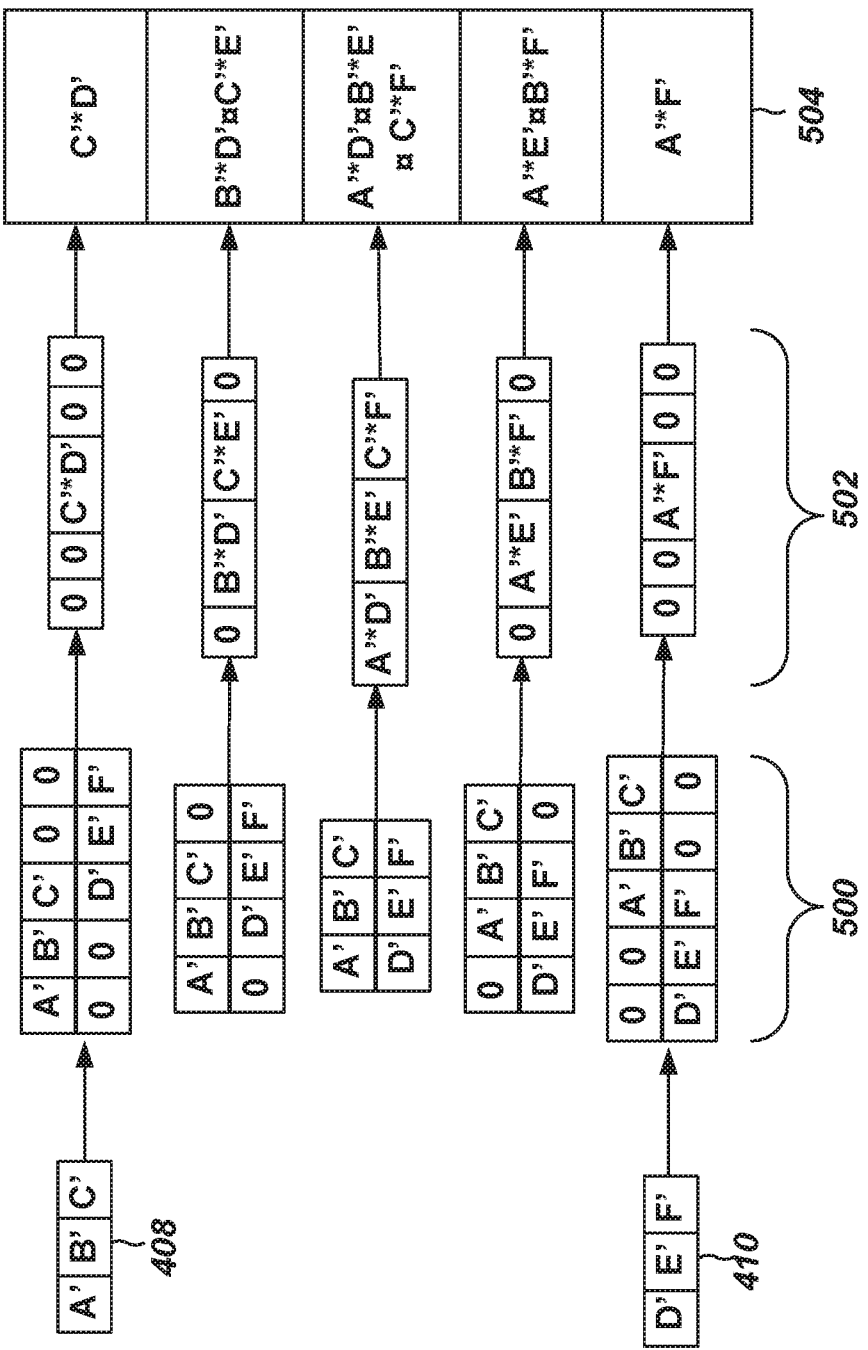
FIG. 5 is a diagram illustrating an example workflow for determining a cross-correlation between input and output representations computed for an input-output example, in accordance with various embodiments.

FIG. 5 illustrates an example workflow for determining a cross-correlation between the input representation 408 and the output representation 410 computed for an input-output example, as may be implemented by the cross-correlation encoder 412. For illustration purposes, the input and output representations 408, 410 are assumed to each encode three-character strings ("ABC" and "DEF," respectively). Each individual character may be encoded in a LSTM hidden representation (e.g., a 2H-dimensional representation) A', B', C', D', E', and F', respectively, and the representations for the individual characters may be concatenated to form an input representation 408 [A', B', C'] and an output representation 410 [D', E', F'].

To compute the cross-correlation, a discrete convolution of the input representation 408 and the output representation 410 may be performed. The convolution involves forming all possible at least partially overlapping alignments between input and output representations 408, 410, with suitable padding (inclusion of zeros to complete non-overlapping portions of the input and output representations 408, 410) (operation 500). For T characters (in our example, T=3), there are (2T−1) such possible alignments. The padded, aligned pairs of input and output representations are then processed element-by-element using some suitable operation. In other words, for each position within each alignment, an operation is then performed on the respective aligned character encodings of the input and output representations 408, 410 at that position (e.g., in the third position of the top-most alignment, on C' and D'); the operation may be or include, e.g., a dot product, multiplication, division, addition, subtraction, concatenation, running an LSTM neural network over the values, or other operation. For instance, in the depicted example, element-wise dot products are computed (operation 502). For each alignment, the values determined at operation 502 may be combined (as indicated by symbol ¤) to yield an element in the distributed representation 504 of the input-output example. The symbol ¤ may represent one or more of a concatenation, sum, average, running an LSTM neural network over the values, or other operation performed on the values determined at operation 502. A summed cross-correlation encoder, for example, includes the symbol ¤ representing addition. In this case, the distributed representation 504 is a (2T−1)-dimensional vector, each element corresponding to one of the alignments.

A diffused cross-correlation encoder includes the symbol representing a concatenation. In the diffused cross-correlation encoder, the distributed representation 504 of each input-output example has the dimensionality of (2T−1)·T (for at most T non-zero values in each of the (2T−1) alignments). An augmented diffused cross-correlation encoder may include combining the output of each character position of the diffused cross-correlation encoder with the character embedding (the distributed representation of the character in the original string) at this position. Then an LSTM neural network is run over the combined features to extract a 4*H-dimensional vector for both the input examples 110 and the output examples 120. The LSTM neural network output may be concatenated with the output of the diffused cross-correlation encoder forming a (4H+7(T−1))-dimensional distributed representation for each input-output example pair.

An LSTM-sum cross-correlation encoder, instead of computing the element-wise dot product of the aligned input-output representations, runs a bidirectional (including forward and backward passes) LSTM neural network over the concatenated feature blocks of each alignment of input and output representations 408, 410 (e.g., for the first alignment, over the vector [A',B',C',0,0,0,0,D',E',F']Each alignment may be represented by the 2H-dimensional bidirectional LSTM hidden representation of the final time step (from both directions). Such an encoder includes 2H·(2T−1) elements in the distributed representation 504 for each input-output example.

While the above-described example embodiments refer specifically to the encoding of input and output strings in the DSL of string transformations, LSTM neural networks and cross-correlation encoders employing the principles described above may also be used to encode other types of input-output examples for other DSLs. Further, various modifications of and alternatives to the input-output encoding embodiments described herein may occur to those of ordinary skill in the art. For instance, input-output encoders as described herein can be augmented with additional external memory and/or attention vectors to learn richer distributed representations.

Program Creation Based on Input-Output Examples

Having described example neural networks for input-output encoders and a program-generation model for the iterative expansion of partial program trees, the disclosure will now turn to a method for automatic program creation using a program-generation model conditioned on encoded input-output examples.

Figure 6:
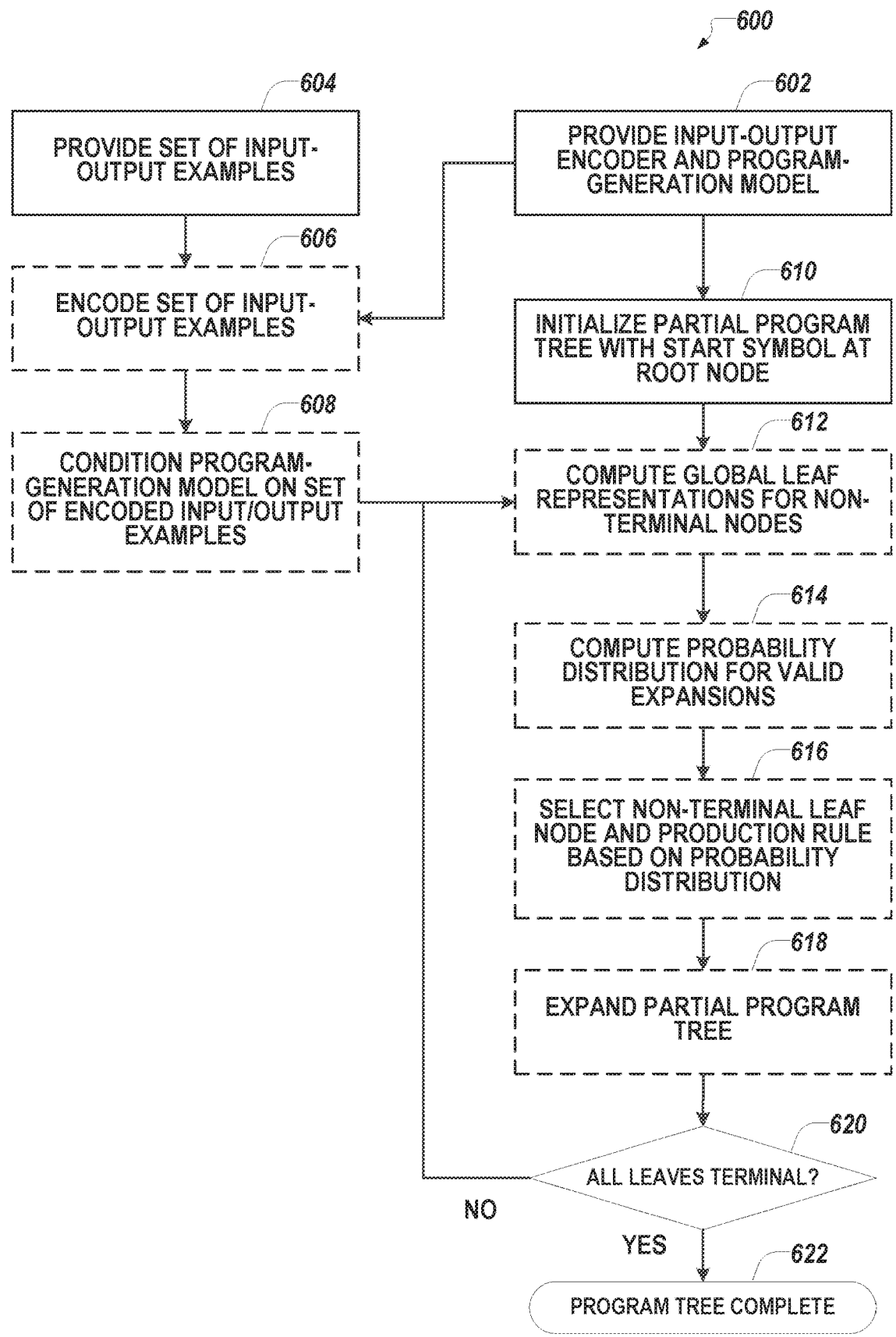
FIG. 6 is a flow chart illustrating an example process for generating a program based on an input-output examples, in accordance with various embodiments.

FIG. 6 is a flow chart illustrating an example method 600, applicable to both training and test phase, for generating a program based on a set of input-output examples, in accordance with various embodiments. The method involves providing an input-output encoder and a program generation model for a given DSL (operation 602), as well as a set of input-output examples (operation 604). In the training phase, the input-output encoder and the program generation model include variable parameters that can be adjusted, after the method 600 has been carried out, based on a comparison of the program automatically generated for the set of input-output examples with a respective program (sampled from the DSL) that was used to generate the set of input-output examples. In the test phase, by contrast, an input-output encoder and program-generation model that were previously trained on a training set of input-output examples and associated programs in the DSL, and that now have fixed parameters, are provided. Either way, the (training or test) set of input-output examples is encoded, in operation 606, using the input-output encoder, and the encoded input-output examples are used, in operation 608, to condition the program-generation model.

The program-generation model generates a program tree representing a target program corresponding to the set of input-output examples by iteratively expanding a partial program tree, beginning with a root node and ending when all leaf nodes are terminal. The partial program tree is initialized using the start symbol of the DSL at the root node (operation 610). Then, in each iteration, global leaf representations of the leaf nodes (at least the non-terminal leaf nodes) are computed (operation 612). Conditioning of the program-generation model on the encoded input-output examples (operation 608) takes place at some point in this step of the process, as explained in more detail below with respect to FIG. 7. From the global leaf representations in conjunction with distributed representations of the production rules of the DSL (as specified by the program-generation model), a probability distribution for all valid expansions of the partial program tree is computed (operation 614). The probability distribution assigns a probability to each expansion, an expansion being specified in terms of the leaf node to the expanded and the production rule to be used in the expansion. For example, the probability distribution may be a normalized distribution over products of the global leaf representations of the leaf nodes and the distributed representations of the production rules. In operation 616, a non-terminal leaf node and production rule are selected for expansion based on the probability distribution. In some embodiments, this operation simply involves selecting the expansion (that is, the leaf-node/production-rule pair) with the highest probability. In other embodiments, the selection involves an element of randomness, and the expansions is selected by sampling the set of valid expansions in accordance with the probability distribution. Whichever way the expansion is selected, the partial program tree is expanded, in operation 618, by applying the selected production rule to the selected leaf node. Then, a determination whether the partial program tree includes any non-terminal leaf nodes (operation 620). If so, another iteration of expanding the partial program tree, again involving conditioning of the program-generation model on the encoded input-output examples (operation 608) to compute global leaf representations (operation 612), is performed. Otherwise, if all leave nodes are terminal, the program tree is complete (at 622).

Figure 7:
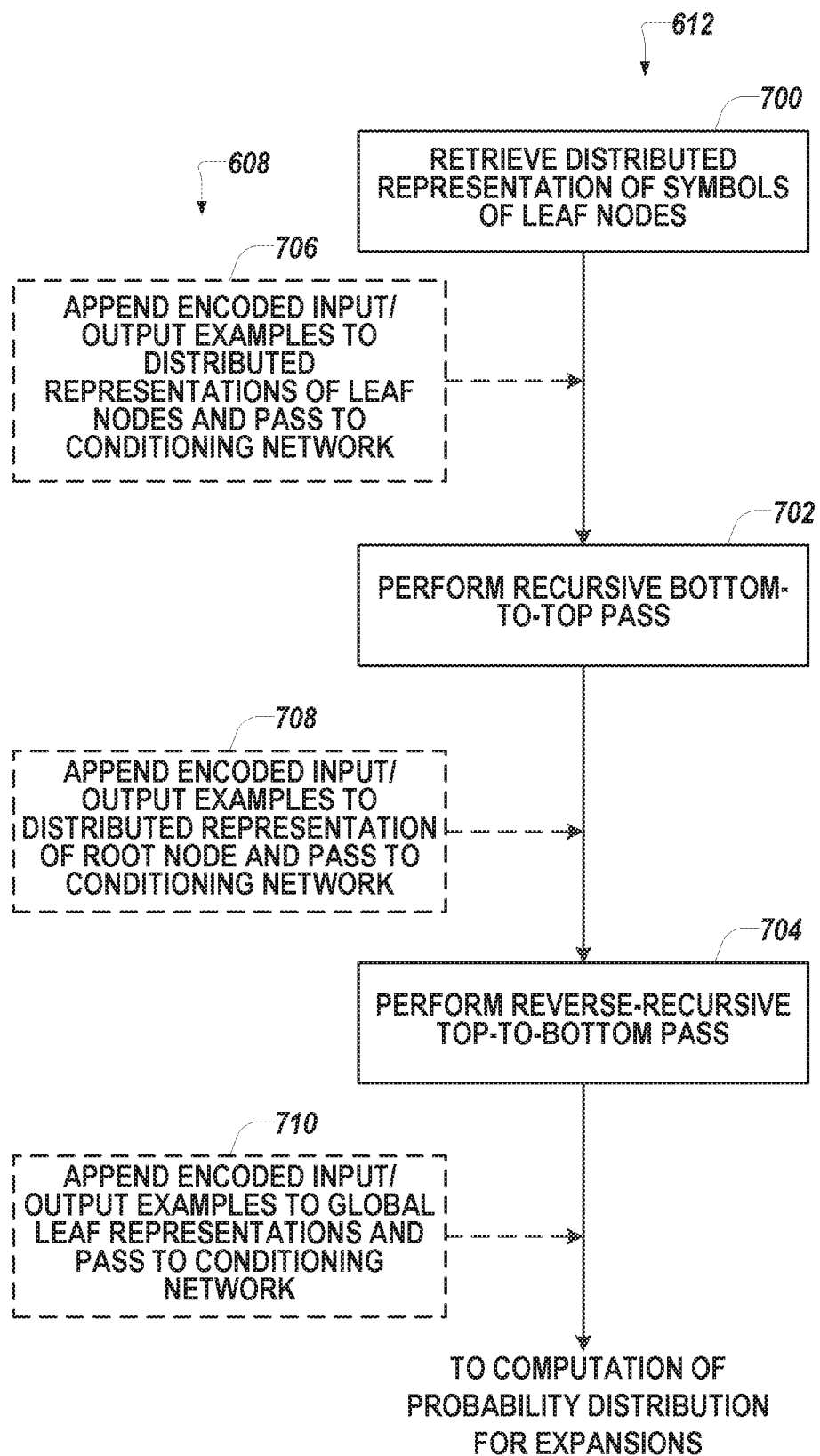
FIG. 7 is a flow chart illustrating in more detail the conditioning of an R3NN based on input-output examples, in accordance with various embodiments.

FIG. 7 is a flow chart illustrating in more detail the conditioning of an R3NN based on input-output examples during the computation of global leaf representations, in accordance with various embodiments. Computing the global leaf representations (operation 612) for a given partial program tree begins with the retrieval of the distributed representations specified by the program-generation model for the symbols associated with the leaf nodes (operation 700). The method proceeds with performing a recursive bottom-to-top pass through the network (operation 702), e.g., as illustrated in FIG. 3A, followed by a reverse-recursive top-to-bottom pass (operation 704), e.g., as illustrated in FIG. 3B. Conditioning on the encoded input-output examples can take place at any one or more steps along the way, as indicated with dashed lines surrounding operations 706, 708, 710, which constitutes three alternatives). In some embodiments, the vector encoding the input-output examples is appended to the retrieved distributed representations of the leaf-node symbols, and the resulting updated distributed representations of the leaf nodes are passed to a conditioning network (operation 706), prior to performing the recursive bottom-to-top pass through the partial program tree in operation 702. In some embodiments, the vector encoding the input-output examples is appended to the distributed representation of the root node obtained at the end of the recursive bottom-to-top pass through the partial program tree, and the resulting updated distributed representations of the root node is passed to a conditioning network (operation 708), prior to performing the reverse-recursive top-to-bottom pass in operation 704. In some embodiments, the vector encoding the input-output examples is appended to the global leaf representations obtained at the end of the reverse-recursive top-to-bottom pass, and the updated global leaf representations are passed to a conditioning network (operation 710), prior to computing the expansion probability distribution in operation 614.

System Implementation

The operations, algorithms, and methods described herein may generally be implemented in suitable combinations of software, hardware, and/or firmware, and the provided functionality may be grouped into a number of components, modules, or mechanisms. Examples of modules include, without limitation, the input-output encoder and program-generation model. Modules can constitute either software modules (e.g., code embodied on a non-transitory machine-readable medium) or hardware-implemented modules. A hardware-implemented module is a tangible unit capable of performing certain operations and can be configured or arranged in a certain manner. In example embodiments, one or more computer systems (e.g., a standalone, client, or server computer system) or one or more processors can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor can be configured as respective different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple such hardware-implemented modules exist contemporaneously, communications can be achieved through signal transmission (e.g., over appropriate circuits and buses that connect the hardware-implemented modules). In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one of processors or processor-implemented modules. The performance of certain of the operations can be distributed among the one or more processors, not only residing within a single machine, but deployed across a number of machines. In some example embodiments, the processor or processors can be located in a single location (e.g., within an office environment, or a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., application program interfaces (APIs)).

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of description language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 8:
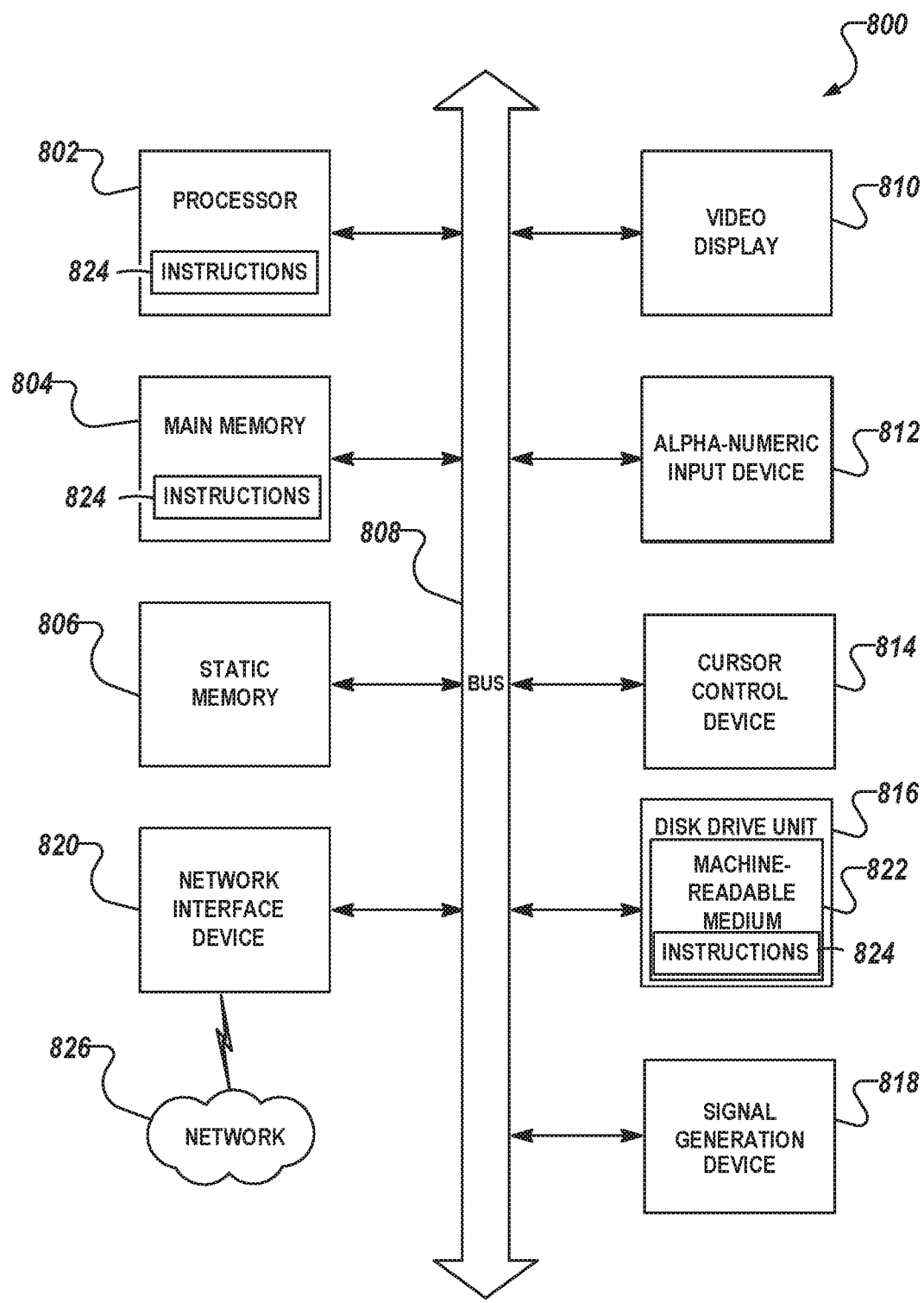
FIG. 8 is a block diagram of a machine in the example form of a computer system within which instructions may be executed to cause the machine to perform any one or more of the methodologies discussed herein.

FIG. 8 is a block diagram of a machine in the example form of a computer system 800 within which instructions 824 may be executed to cause the machine to perform any one or more of the methodologies discussed herein. In alternative embodiments, the machine operates as a stand-alone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 can further include a video display 810 (e.g., a liquid crystal display (LCD) or a cathode ray tube (CRT)). The computer system 800 also includes an alpha-numeric input device 812 (e.g., a keyboard or a touch-sensitive display screen), a user interface (UI) navigation (or cursor control) device 814 (e.g., a mouse), a disk drive unit 816, a signal generation device 318 (e.g., a speaker), and a network interface device 820.

The disk drive unit 816 includes a machine-readable medium 822 on which are stored one or more sets of data structures and instructions 824 (e.g., software) embodying or utilized by any one or more of the methodologies or functions described herein. The instructions 824 can also reside, completely or at least partially, within the main memory 804 and/or within the processor 802 during execution thereof by the computer system 800, with the main memory 804 and the processor 802 also constituting machine-readable media.

While the machine-readable medium 822 is shown in an example embodiment to be a single medium, the term "machine-readable medium" can include a single medium or multiple media (e.g., a centralized or distributed database, and/or associated caches and servers) that store the one or more instructions 824 or data structures. The term "machine-readable medium" shall also be taken to include any tangible medium that is capable of storing, encoding, or carrying instructions 824 for execution by the machine and that cause the machine to perform any one or more of the methodologies of the present disclosure, or that is capable of storing, encoding, or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

The instructions 824 can be transmitted or received over a communication network 826 using a transmission medium. The instructions 824 can be transmitted using the network interface device 820 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi and WiMax networks). The term "transmission medium" shall be taken to include any intangible medium that is capable of storing, encoding, or carrying instructions 824 for execution by the machine, and includes digital or analog communications signals or other intangible media to facilitate communication of such software.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. A method comprising:
   for a given domain-specific language that defines a plurality of symbols and a plurality of production rules, providing an input-output encoder and a program-generation model comprising a neural network, the input-output encoder and the neural network having been trained on a plurality of programs within the domain-specific language and a plurality of respective training sets of input-output examples associated with the programs, wherein, for each of the plurality of programs and its associated training set, each input-output example of the training set comprises a pair of an input to the program and a corresponding output produced by the program from the input;
   providing a test set of input-output examples for a target program;
   using one or more hardware processors to perform operations for generating the target program based on the test set of input-output examples, the operations comprising:
      encoding the test set of input-output examples using the input-output encoder;
      conditioning the program-generation model on the encoded set of input-output examples; and
      using the neural network to generate a program tree representing the target program by iteratively expanding a partial program tree, beginning with a root node and ending when all leaf nodes are terminal, based on a computed probability distribution for a set of valid expansions, wherein leaves in the program tree and the partial program tree represent symbols in the domain-specific language and wherein non-leaf interior nodes in the program tree and the partial program tree represent production rules in the domain-specific language.

2. The method of claim 1, wherein the neural network is a recursive-reverse-recursive neural network.

3. The method of claim 2,
wherein the recursive-reverse-recursive neural network specifies distributed representations of the plurality of symbols and the plurality of production rules and, for each of the plurality of production rules, first and second deep neural networks, and
wherein iteratively expanding the partial program tree comprises, in each iteration:
computing global leaf representations for at least non-terminal ones of the leaf nodes of the partial program tree by retrieving the distributed representations of the symbols represented by the leaf nodes, performing a recursive bottom-to-top pass through the partial program tree from the leaf nodes to the root node using the first deep neural networks, and thereafter performing a reverse-recursive top-to-bottom pass through the partial program tree from the root node to the leaf nodes using the second deep neural networks;
computing the probability distribution for the set of valid expansions from the global leaf representations and the distributed representations of the production rules;
selecting a non-terminal leaf node and a production rule based on the computed probability distribution; and
expanding the partial program tree by applying the selected production rule to the selected non-terminal leaf node.

4. The method of claim 3, wherein the program-generation model is conditioned prior to performing the recursive bottom-to-top pass by appending the encoded set of input-output examples to the distributed representations of the symbols associated with the leaf nodes to obtain updated distributed representations of the leaf nodes, and passing the updated distributed representations to a conditioning network.

5. The method of claim 3, wherein the program-generation model is conditioned after performing the recursive bottom-to-top pass and prior to performing the reverse-recursive top-to-bottom pass by appending the encoded set of input-output examples to a distributed representation of the root node resulting from the bottom-to-top pass to thereby obtain an updated distributed representation of the root node, and passing the updated distributed representation of the root node to a conditioning network.

6. The method of claim 3, wherein the program-generation model is conditioned after performing the reverse-recursive top-to-bottom pass by appending the encoded set of input-output examples to the global leaf representations to obtain updated global leaf representations, and passing the updated global leaf representations to a conditioning network prior to computing the probability distribution.

7. The method of claim 3, wherein encoding the set of input-output examples comprises processing input and output of each input-output example separately using two respective deep bidirectional long short term memory neural networks to obtain respective input and output representations, and computing a cross correlation between each input example representation and the respective output example representation.

8. The method of claim 3, wherein the probability distribution is a normalized exponential distribution over products of the global leaf representations and the distributed representations of the production rules.

9. The method of claim 3, further comprising processing the global leaf representations with a bidirectional long short term memory neural network prior to computing the probability distribution.

10. The method of claim 3, wherein the production rules defined by the domain-specific language are string transformations.

11. A system comprising:
one or more hardware processors; and
one or more machine-readable media storing instructions that, when executed by the one or more hardware processors, cause the one or more hardware processors to perform operations for generating a target program in a domain-specific language based on a test set of input-output examples each comprising a pair of an input and an output to be produced by the target program from the input, the domain-specific language defining a plurality of symbols and a plurality of production rules, the operations comprising:
using an input-output encoder to encode the test set of input-output examples provided for the target program, the input-output encoder trained on a plurality of programs within the domain-specific language and a plurality of respective training sets of input-output examples associated with the programs, wherein, for each of the plurality of programs and its associated training set, each input-output example of the training set comprises a pair of an input to the program and a corresponding output produced by the program from the input;
conditioning a program-generation model on the encoded set of input-output examples, the program-generation model comprising a neural network trained, together with the input-output encoder, on the plurality of programs and the plurality of respective training sets of input-output examples; and
using the neural network to generate a program tree representing the target program by iteratively expanding a partial program tree, beginning with a root node and ending when all leaf nodes are terminal, based on a computed probability distribution for a set of valid expansions, wherein leaves in the program tree and the partial program tree represent symbols in the domain-specific language and wherein non-leaf interior nodes in the program tree and the partial program tree represent production rules in the domain-specific language.

12. The system of claim 11,
wherein the neural network is a recursive-reverse-recursive neural network that specifies distributed representations of the plurality of symbols and the plurality of production rules and, for each of the plurality of production rules, first and second deep neural networks; and
wherein iteratively expanding the partial program tree comprises, in each iteration, operations comprising:
computing global leaf representations for at least non-terminal ones of the leaf nodes of the partial program tree by retrieving the distributed representations of the symbols represented by, performing a recursive bottom-to-top pass through the partial program tree from the leaf nodes to the root node using the first deep neural networks, and thereafter performing a reverse-recursive top-to-bottom pass through the partial program tree from the root node to the leaf nodes using the second deep neural networks;

computing the probability distribution for the set of valid expansions from the global leaf representations and the distributed representations of the production rules;

selecting a non-terminal leaf node and a production rule based on the computed probability distribution; and expanding the partial program tree by applying the selected production rule to the selected non-terminal leaf node.

13. The system of claim 12, wherein the program-generation model is conditioned prior to performing the recursive bottom-to-top pass by appending the encoded set of input-output examples to the distributed representations of the symbols associated with the leaf nodes to obtain updated distributed representations of the leaf nodes, and passing the updated distributed representations to a conditioning network.

14. The system of claim 12, wherein the program-generation model is conditioned after performing the recursive bottom-to-top pass and prior to performing the reverse-recursive top-to-bottom pass by appending the encoded set of input-output examples to a distributed representation of the root node resulting from the bottom-to-top pass to thereby obtain an updated distributed representation of the root node, and passing the updated distributed representation of the root node to a conditioning network.

15. The system of claim 12, wherein the program-generation model is conditioned after performing the reverse-recursive top-to-bottom pass by appending the encoded set of input-output examples to the global leaf representations to obtain updated global leaf representations, and passing the updated global leaf representations to a conditioning network prior to computing the probability distribution.

16. One or more machine-readable media storing instructions for execution by one or more hardware processors, the instructions, when executed by the one or more hardware processors, causing the one or more hardware processors to perform operations for generating a target program in a domain-specific language based on a test set of input-output examples each comprising a pair of an input and an output to be produced by the target program from the input, the domain-specific language defining a plurality of symbols and a plurality of production rules, the operations comprising:

using an input-output encoder to encode the test set of input-output examples provided for the target program, the input-output encoder trained on a plurality of programs within the domain-specific language and a plurality of respective training sets of input-output examples associated with the programs, wherein, for each of the plurality of programs and its associated training set, each input-output example of the training set comprises a pair of an input to the program and a corresponding output produced by the program from the input;

conditioning a program-generation model on the encoded set of input-output examples, the program-generation model comprising a neural network trained, together with the input-output encoder, on the plurality of programs and the plurality of respective training sets of input-output examples; and using the neural network to generate a program tree representing the target program by iteratively expanding a partial program tree, beginning with a root node and ending when all leaf nodes are terminal, based on a computed probability distribution for a set of valid expansions, wherein leaves in the program tree and the partial program tree represent symbols in the domain-specific language and wherein non-leaf interior nodes in the program tree and the partial program tree represent production rules in the domain-specific language.

* * * * *